Figure 1:
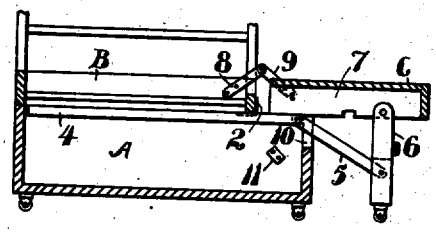

No. 12,652.

REISSUED MAY 14, 1907.

J. HOEY.

BED COUCH.

APPLICATION FILED SEPT. 1, 1904.

Witnesses:-
F. C. Fliedner
J. Inness

Inventor,
John Hoey
By Geo. H. Strong
Atty

THE NORRIS PETERS CO., WASHINGTON, D. C.

UNITED STATES PATENT OFFICE.

JOHN HOEY, OF SAN FRANCISCO, CALIFORNIA.

BED-COUCH.

No. 12,652. Specification of Reissued Letters Patent. Reissued May 14, 1907.

Original No. 714,375, dated November 25, 1902. Application for reissue filed September 1, 1904. Serial No. 222,953.

*To all whom it may concern:*

Be it known that I, JOHN HOEY, a citizen of the United States, residing in the city and county of San Francisco, State of California, have invented an Improvement in Bed-Couches; and I hereby declare the following to be a full, clear, and exact description of the same.

My invention relates to improvements in bed couches. It is especially designed as an improvement on that class of couches having a hollow box or base adapted to contain bed-clothing and the like, a seat frame hinged to the rear portion of the base, and a back turnably supported from the seat portion having legs and braces for said legs, which when folded up into the back serve as a support to hold the back in its upright position. When unfolded, the braces extend the legs so as to support the back in a horizontal position substantially level with the seat portion, both being upholstered. This class of invention is well shown in the patent to L. G. Beloud No. 586,959 dated July 27th 1897.

The objects of my invention are particularly to balance more perfectly the seat and back portions upon the box or hollow base when the seat is lifted to give access to the box; to guard against the legs dropping down accidentally when the seat is lifted to the possible injury of both furniture and operator; to support the lower edge of the back when the latter and the seat together are turned about the seat hinges to allow access to the box, and to afford a substantial support for the side of the back portion adjacent to the seat when the back is opened out to form a bed. These objects are obtainable by a construction which comprehends hinging the seat on the top and near the rear edge of the box, providing the seat with rearwardly extending projections on its under side which projections are preferably contained within the box, and in providing slots on the box with which the links or braces connecting the projections and the legs on the back portion of the couch may engage when the seat is lifted to open the box or when the back is opened out to form a bed. This arrangement of the projections on and beneath the seat and of the slots for the braces is such as to allow the full length of the lower edge of the back to be supported upon the rear edge of the box for the seat and back to be supported endwise, and for the braces to be supported by the sides and bottom of the slots when the seat is lifted, to prevent buckling of the toggle formed by the braces and legs. Generally in bed couches of this character the braces and legs have no support other than their respective pivotal connections with the seat and back, and the seat and back have depended solely on their hinges for support in their pivotal movement.

The invention consists of the parts and the construction and combination of parts as hereinafter more fully described and claimed, having reference to the accompanying drawings, in which—

Figure 2:
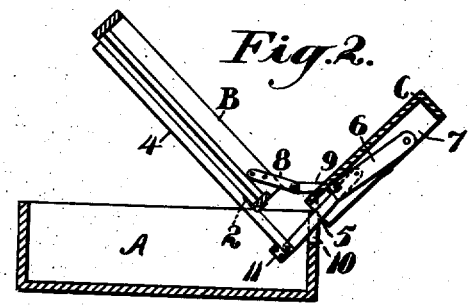
Figure 3:
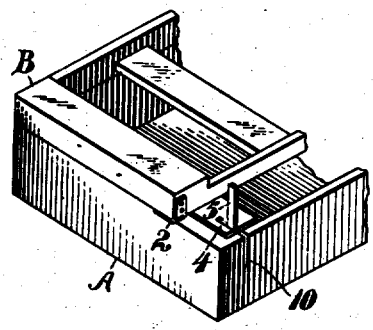
Figure 4:
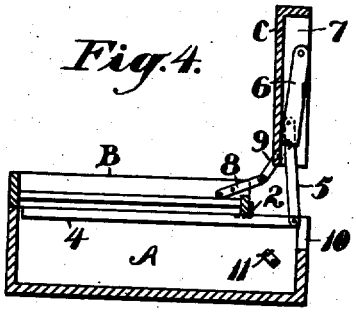
Figure 5:
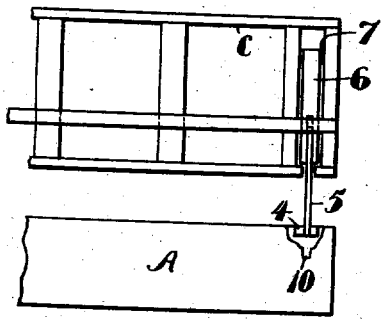

Figure 1 is a transverse section of the couch with the back in a horizontal position to form a bed. Fig. 2 is a similar view showing the seat and back tilted backward so as to allow access to the box and stops for the side bars. Fig. 3 is a perspective view showing part of one end. Fig. 4 is a sectional view showing the back in an upright position and the legs folded into the channels in the back. Fig. 5 is a rear view of Fig. 4.

As herein illustrated, my device consists of a box or base A, a seat portion B, and a back C. The seat portion consists of front, rear, and end bars or timbers suitably secured together and having intermediate supports for the upholstery. As shown the seat portion is narrower than the box, and has its rear edge hinged upon the top of the box, as at 2, so that the front edge is substantially even with the front of the box, while the rear edge is located considerably in front of the rear of the box. The side bars or timbers 4 of the seat-frame extend from the under side of the seat, back to a point just interior to the rear side of the box, and the braces 5, connecting with the lower part of the legs 6, are pivoted to the rear ends of these bars. The legs themselves have their upper ends pivoted, as shown at 7, in grooves or channels formed transversely in the ends of the back portion C, so that when the back is in a vertical position the legs and braces lie substantially within these channels, and the junction of the legs and braces form inturned obtuse angles, which act as a lock and brace to hold the back in its vertical position and to prevent pressure thereon from accidentally forcing it away from this position. The back is connected with the seat portion by straps 8, which are firmly secured to the ends of the seat portion, and straps 9, which are secured to the back portion, the meeting ends of the straps 8 and 9 being pivoted together, so that the back turns about these pivots. The side bars 4 of the seat portion are here shown as being substantially flush with the top of the box and extending back of the hinges to the rear interior portion of the box. In order to allow the braces or links 5 which are connected with the rear ends of the side bars 4 to drop into the inclined position which they occupy when the back C and the legs have been opened outwardly, I provide suitable guides as the slots or channels 10 in the back and in line with the edges of the braces 5, so that the latter may drop down into the position shown in Fig. 1 when the back has been opened out to form the bed. When the back is in its vertical position and the legs folded into the channels in the end bars of the back, as previously described, the braces extend nearly vertically upward into the back, being inclined a little forward, as previously described, to act as braces to hold the back and prevent the legs from swinging out. In this position the back stands substantially at right angles with the seat portion, and when it is desired to obtain access to the box it is only necessary to lift the seat portion which turns about its hinges 2. When this is done, the links 5 engage the guide slots 10 in the back of the box until the bottom rail of the back is supported by the upper edge of the box. The edge of the box provides a continuous rigid support for the side of the back adjacent to the seat when opened out as in either Fig. 1 or Fig. 2, and prevents any danger of breakage; and by reason of the seat being fulcrumed to the box, and the back to the seat, as shown, and by having the links pivotally connected with the seat at points below the seat hinges the seat and back are more evenly balanced and are much more easily lifted to obtain access to the box.

In the present construction, the guide slots 10 not only permit the back to be supported in the manner described, but they serve as lateral supports for the links and at points intermediate of the ends of the links so that the latter and the back and the legs are all held and braced more rigidly than where such or equivalent guide means are not provided. But what is of particular importance is this: By having the inner ends of the braces drawn into the box when the seat is lifted and balanced on the back of the box, the braces and legs are prevented from dropping down since the slotted back offers, as is obvious, a stop intermediate of the ends of the braces against any such pivotal movement of the braces and legs as would disturb the equilibrium of the seat and back.

The seat portion has the usual head at one end and a top portion hinged to it at the rear and adapted to be opened out so as to form a continuation therewith and to support the pillows and the part of the bed which is formed by the back when the latter is opened out. This forming no part of my present invention is only here described to show the complete construction of the device.

Stops 11 may be fixed to the ends of the box and in such position that the projecting ends of the bars 4 will contact with these stops when the seat is opened to obtain access to the box and either wholly support the parts in their open position or act in conjunction with the stop afforded by the seat itself. These stops 11 arrest the projecting ends of the bars 4 when the box is opened by tilting the seat and back together about the hinge connection of the seat with the box at 2. The rearwardly extending ends of the bars 4 are thus depressed into the box until they strike the stops at the same time that the bottom of the back contacts with the back of the box, and the stops relieve these two contacting portions of the strain otherwise due to their proximity to the hinges and the weight of the tilted parts.

Having thus described my invention, what I claim and desire to secure by Letters Patent is—

1. The combination in a bed couch of a hollow box or base, a seat narrower than the box having its front edge flush therewith and the rear edge hinged to the top of the box, said seat having its end bars extended to points just within the back of the box, a back hinged to the seat adapted to be opened out about its hinges or to stand at approximately right angles with the seat, legs pivoted to the upper part of the back, braces connecting the lower parts of the legs with the rear ends of the side bars, and acting in conjunction with the legs to retain the back in its vertical position, the back of the base having slots into which the braces may pass, whereby the seat and back may be turned about the seat hinges and the lower edge of the back rest upon the top edge of the box.

2. The combination in a bed-couch of a containing box or base, a seat hinged to the top of the box between the front and rear, said seat having side bars extending back of the hinges, and within the box, stops within the box against which said bars contact when the seat is opened, and a back portion pivotally connected to said seat and to the ends of said bars.

3. The combination in a bed-couch of a containing box or base, a seat hinged to the box top between the front and rear, rigid side bars on said seat extending behind the hinges, a back carried by and turnable in unison with the seat about its hinges to open the box, the lower edge of the back contacting with the box when opened, and stops against which the seat side bars simultaneously contact.

4. In a bed-couch, a hollow base, a seat having bars projecting rearwardly within the box, and hinges connecting the seat with the base forward of the rear ends of the bars, a back turnably connected with the seat, and braces connecting said back with the seat bars and normally holding it at right angles and tiltable in unison with the seat, the back of the box having slots to admit the braces and means to limit the tilting movement of the seat and back.

5. In a bed couch, a hollow base, a seat hinged to the base between the front and rear and having side bars extending within and to the rear of the box, a back having foldable legs pivoted therein, braces connecting the legs with the seat bars the connection of said braces with said bars being, when the seat is closed, proximate to the horizontal plane of the seat hinges to make it easy for the back to overbalance the seat when the two are tilted backward and channels in the rear of the base within which the braces are received when the seat and back are tilted to the rear and means for limiting such tilting movement.

6. The combination in a bed-couch of a hollow base, a seat hinged to the top and in advance of the rear of the base, a back pivotally connected with the seat, a foldable leg on the back and a link connecting the leg with a part rigid with the seat, and means other than the pivotal connection of the back with the seat for supporting the edge of the back adjacent to the seat when the back is opened out to form a bed.

7. The combination in a bed-couch of a hollow base, a seat hinged to the top and in advance of the rear of the base, a back pivotally connected with the seat, a foldable leg on the back and a link connecting the leg with a part rigid with the seat, means other than the pivotal connection of the back with the seat for supporting the edge of the back adjacent to the seat when the back is opened out to form a bed, and the back of the couch having a slot to accommodate and guide the link.

8. A bed couch comprising a hollow base, a seat hinged to the top and proximate to the back of the base, projections from the rear under side of the seat, said projections being wholly contained within the base and extending beyond the hinges of the seat, a back portion pivotally connected with the seat, legs hinged to the back and links pivotally connected to the legs and to said seat projections, and means admitting of the back being opened out into the plane of the seat and of the legs contacting with the floor to support the back in such opened position.

9. In a bed couch, the combination of a hollow base, a seat hinged to the base and having rearward projections within the base and below and beyond its hinges, a back turnably connected with the seat, braces connecting the back with said seat projections and tiltable in unison with, and normally holding the back at right angles to the seat, and slots in the base and in the plane of said braces to receive and guide the latter when the parts are turned on their pivots.

10. A bed-couch comprising a hollow box or base, a seat and a back, the seat having bars which project beyond it to a point underneath the back, a support for the back pivoted to said bars and arranged to hold the back at right angles with the seat both when used as a sofa or tilted back to gain access to the box, the seat pivoted to the base at a suitable distance front of the pivot of the support of the back on said rearwardly projecting seat bars to make it easy for the back to overbalance the seat when tilted backward, and a suitable stop between the base and the back to prevent the back sinking farther than is desirable to make it safe and easy to open and close when the back is at right angles with the seat.

11. In a couch, the combination of a box or hollow base, a seat hinged thereto forward of the back of the box, rearward projections on the seat, a back hinged to the seat, legs hinged to the back, braces hinged to the legs and to said rearward projections, said braces, legs and back coöperating to hold the back at right angles to the seat, and means interposing a stop to the pivotal movement of the braces when the seat is turned on its hinges to give access to the box.

12. In a couch, the combination of a box or hollow base, a seat hinged thereto forward of the back of the box, rearward projections on the seat, a back hinged to the seat, legs hinged to the back, braces hinged to the legs and to said rearward projection, said braces, legs and back coöperating to hold the back at right angles to the seat, and means interposing a stop to the pivotal movement of the braces when the seat is turned on its hinges to give access to the box, said stop means provided by the back of the box.

In witness whereof I have hereunto set my hand.

JOHN HOEY.

Witnesses:
W. R. PEASE,
EUGENE W. HOEY.